(12) United States Patent
Hsu et al.

(10) Patent No.: US 12,460,024 B2
(45) Date of Patent: *Nov. 4, 2025

(54) POLYOLEFIN POLYMER INCORPORATING HINDERED PHENOL AND MANUFACTURE THEREOF

(71) Applicant: Advanced Polyolefin Technologies LLC, State College, PA (US)

(72) Inventors: Tim Hsu, State College, PA (US); Minren Lin, State College, PA (US); Tze-Chiang Chung, State College, PA (US)

(73) Assignee: ADVANCED POLYOLEFIN TECHNOLOGIES LLC, State College, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/593,488

(22) Filed: Mar. 1, 2024

(65) Prior Publication Data
US 2024/0218093 A1 Jul. 4, 2024

Related U.S. Application Data

(63) Continuation of application No. PCT/US2022/042423, filed on Sep. 2, 2022.

(60) Provisional application No. 63/241,706, filed on Sep. 8, 2021, provisional application No. 63/240,604, filed on Sep. 3, 2021.

(51) Int. Cl.
*C08F 10/06* (2006.01)

(52) U.S. Cl.
CPC .......... *C08F 10/06* (2013.01); *C08F 2810/00* (2013.01)

(58) Field of Classification Search
CPC .... C08L 51/06; C08L 51/003; C08F 2810/00; C08F 8/14; C08F 110/06; C08F 210/06; C08F 8/46; C08F 216/04; C08F 216/14; C08F 4/65927
See application file for complete search history.

(56) References Cited

U.S. PATENT DOCUMENTS

| | | | | |
|---|---|---|---|---|
| 4,743,657 | A * | 5/1988 | Rekers | C08F 8/30 525/445 |
| 4,857,596 | A * | 8/1989 | MacLeay | C08F 8/34 525/329.6 |
| 5,401,805 | A | 3/1995 | Chung et al. | |
| 5,650,468 | A | 7/1997 | Vandevijver et al. | |
| 5,866,659 | A | 2/1999 | Chung et al. | |
| 5,976,652 | A | 11/1999 | Krause et al. | |
| 6,699,949 | B2 | 3/2004 | Chung | |
| 11,820,848 | B2 * | 11/2023 | Hsu | C08F 255/02 |
| 2002/0123577 | A1 * | 9/2002 | Pfaendner | C08K 5/005 525/903 |
| 2008/0214707 | A1 * | 9/2008 | Gong | C08F 8/32 524/188 |
| 2021/0277159 | A1 | 9/2021 | Hsu et al. | |

FOREIGN PATENT DOCUMENTS

| | | |
|---|---|---|
| CN | 102321217 A | 1/2012 |
| CN | 102924661 A | 2/2013 |
| WO | 9818830 A1 | 5/1998 |
| WO | 2018202562 A1 | 11/2018 |

OTHER PUBLICATIONS

Chung, "Expanding Polyethylene and Polypropylene Applications to High-Energy Areas by Applying Polyolefin-Bonded Antioxidants", Macromolecules, 52, pp. 5618-5637, 2019.
De Roover, J. Poly Sci, Part A: Poly Chem, 1995(33):829-842.
Diop, M. F. et al. "Maleic anhydride functionalization of polypropylene with suppressed molecular weight reduction via solid-state shear pulverization", Polymer, 2013, vol. 54, No. 16, pp. 4143-4154.
Felix et al., "The Nature of Adhesion in Composites of Modified Cellulose Fibers and Polypropylene", Journal Appl. Polymer. Sci. 42, pp. 609-620, 1991.
Hopmann et al., "Introduction to Reactive Extrusion", Reactive Extrusion: Principles and Applications, First Edition. Ed Beyer and Hopmann, Wiley-VCH Verlag GmbH & Co. KGaA, pp. 3-10, 2018.
Priola, et al. Eur. Poly. J 1994(30):1047-1050.
Zhang et al., Macromolecules, 2017:50:7041-7051.
Zhang et al. "Increasing Polypropylene High Temperature Stability by Blending Polypropylene-Bonded Hindered Phenol Antioxidant", Macromolecules, vol. 51, Issue 5, pp. 1927-1936, 2018.
Zhang, G. et al., "Synthesis of functional polypropylene containing hindered phenol stabilizers and applications in metallized polymer film capacitors", Macromolecules, 2015, vol. 48, No. 9, pp. 2925-2934.
Zhu et al., "Polyethylene Containing Antioxidant Moieties Exhibiting High Thermal-Oxidative Stability for High Teperature Applications", Polymer, 146, pp. 101-108, 2018.

* cited by examiner

*Primary Examiner* — Mark S Kaucher
(74) *Attorney, Agent, or Firm* — BakerHostetler

(57) ABSTRACT

Polyolefins incorporating hindered phenol groups covalently bound thereto are disclosed. The hindered phenols are covalently bound to the polyolefin through a residue of an alkenyl compound having a carboxylic acid and/or anhydride on the polyolefin. Such polyolefins can be prepared by reacting the following components together under heat: (a) a polyolefin; (b) an alkenyl compound having a carboxylic acid and/or anhydride; and (c) a hindered phenol reagent that can react with the carboxylic acid and/or anhydride of the alkenyl compound; to produce a polyolefin having hindered phenol groups covalently bound thereto. Reactive compounding of such components allows preparation of such polyolefins in a continuous process and in a single reaction step.

21 Claims, 4 Drawing Sheets

POLYOLEFIN POLYMER INCORPORATING HINDERED PHENOL AND MANUFACTURE THEREOF

CROSS-REFERENCE TO RELATED APPLICATION

This is a continuation of International Application No. PCT/US2022/042423 having an international filing date of 2 Sep. 2022, which claims the benefit of U.S. Provisional Application No. 63/240,604 filed 3 Sep. 2021 and the benefit of U.S. Provisional Application No. 63/241,706 filed 8 Sep. 2021.

TECHNICAL FIELD

The present disclosure relates to thermally stable polyolefins incorporating covalently bound hindered phenols.

BACKGROUND

Polyolefins, such as polypropylene (PP) and polyethylene (PE), are a versatile family of polymers mostly used in commodity applications having advantages of low cost, good processability, good thermal and electric insulation characteristics, low moisture sensitivity, excellent recyclability, etc. However, polyolefin, including PE and PP, products are not used in applications that require long-term exposure to elevated temperatures, high electric fields, organic solvents, and combinations of those, due to both chemical and physical stability concerns (See Macromolecules, 2019:52:5618-5637).

To improve the thermal stability of polyolefins, it is common practice to add various additives, including a small amount (<0.5 wt %) of antioxidants and UV-stabilizers, in commercial polyolefin products immediately after polymerization. Hindered phenol (HP) antioxidants, such as octadecyl-3-(3,5-di-tert-butyl-4-hydroxyphenyl)-propionate (Irganox® 1076) and pentaerythritol tetrakis(3-(3,5-di-tert-butyl-4-hydroxyphenyl)propionate) (Irganox®1010), are commonly admixed with polyolefin products. The blended antioxidants can prevent polyolefins from chain thermal-oxidative degradation during melt processes, in which the molten mixture is constantly mixed under elevated temperature with a uniform phase for only a short processing time (i.e., a few minutes).

However, it is difficult to maintain a homogeneous mixture between antioxidants, which are typically polar molecules and non-polar polyolefins, particularly semicrystalline polyethylene (PE) or polypropylene (PP) and in solid state form. This incompatibility also contributes to the continuous diffusion of additives from bulk polyolefins to surface regions, which accelerates when the material is exposed to solvents, heat, or constant (strong) electric fields. It is thus difficult to maintain a minimum effective antioxidant concentration throughout polyolefins such as PE and PP products.

Hence a continuing need exists to improve thermal, mechanical, electrical and other properties of polyolefins for increasingly demanding application in economical and commercially suitable processes.

SUMMARY OF THE DISCLOSURE

Advantages of the present disclosure include thermally stable polyolefins having covalently bound pendant hindered phenols.

These and other advantages are satisfied, at least in part, by a polyolefin comprising hindered phenol groups covalently bound to the polyolefin through a residue on the polyolefin. The residue is formed by an alkenyl compound having a carboxylic acid and/or anhydride.

Another aspect of the present disclosure includes a process of preparing a polyolefin having pendant hindered phenol groups by reacting the following components together under heat: (a) a polyolefin; (b) an alkenyl compound having a carboxylic acid and/or anhydride; and (c) a hindered phenol reagent that can react with the carboxylic acid and/or anhydride of the alkenyl compound; to produce a polyolefin having hindered phenol groups covalently bound thereto. The reactive components can further comprise a free radical initiator. Polyolefins having pendant hindered phenols can be prepare from a relatively large range of the reactive components. For example, the process can include 600 to 50 parts by weight of (a) the polyolefin, 1 to 20 parts by weight of (b) the alkenyl compound, and 10 to 90 parts by weight of (c) the hindered phenol reagent. Advantageously, the reactive components can be melt compounded in the extruder at a temperature of the components of at least about 180° C. and less than about 280° C. to form the polyolefin having hindered phenol groups.

Embodiments of the present disclosure include the following features individually or combined. For example, the polyolefin can comprise a polypropylene. In some embodiments the alkenyl compound can comprises one or more cyclic alkenyl anhydrides, e.g., maleic anhydride. In other embodiments, the polyolefin can have a certain mol % of hindered phenol groups with free hydroxyl groups covalently bound thereto such as from greater than zero and no more than about 20 mol %, e.g., from 0.05 mol %, 0.1 mol %, 0.2 mol %, etc. up to about 15 mol %, up to about 10 mol %, up to about 5 mol %, up to about 3 mol %, up to about 2 mol %, etc. and values therebetween of hindered phenol groups with free hydroxyl groups covalently bound to the polyolefin.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent similar elements throughout and wherein.

DETAILED DESCRIPTION OF THE DISCLOSURE

Figure 1:
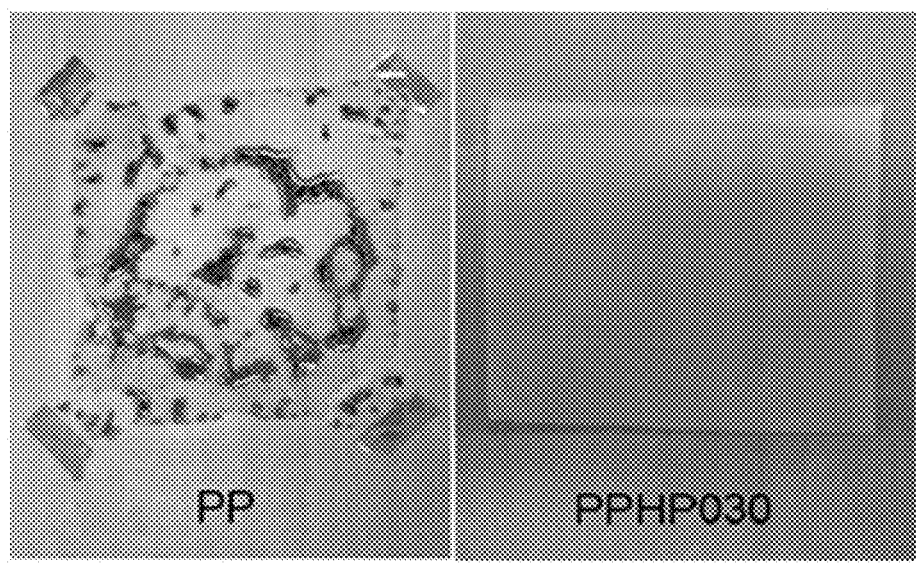
FIG. 1 shows pictures of a film composed of a commercially available polypropylene (PP) and a film of the polypropylene after covalently attaching hindered phenol groups according to aspects of the present disclosure (PPHP030) after subjecting the films to a temperature of 170° C. in air for about 1.5 hours.

The present disclosure relates to polyolefins having covalently bonded pendant hindered phenols prepared directly from the polyolefin by reacting (a) a polyolefin with (b) an alkenyl compound having a carboxylic acid and/or anhydride, and (c) a hindered phenol reagent, under heat. Preferably the polyolefin is in the molten state during the reaction. A free radical initiator can be added to the reactive components to accelerate the formation of the polyolefin with hindered phenol groups bound thereto. It is believed that under such conditions, the alkenyl compound grafts or is added to the polyolefin chain via a selective free radical reaction with the alkenyl group and the hindered phenol reagent couples to the carboxylic acid and/or anhydride of the alkenyl compound via an esterification reaction. The free radical reaction may precede the esterification reaction or the reactions can occur simultaneously or in any order.

The combination of a polyolefin, an alkenyl compound, and a hindered phenol reagent to directly produce a polyolefin having hindered phenol groups covalently bound thereto was not expected. Hindered phenols are known to scavenge free radicals in a system. In addition, the hydroxyl group on a hindered phenol is sterically hindered, which may reduce its ability to undergo esterification reactions.

However, it is believed that under the reaction conditions employed in the present disclosure, hindered phenols can serve as stabilizers by forming stable radical pairs that minimize side reactions (chain degradation and crosslinking) in polyolefin chains. Thus, the resulting polyolefin having pendant hindered phenol moieties can maintain high molecular weight and good melt-processability. Furthermore, it is believed the hindered phenols can also prevent oligomerization of alkenyl compounds having a carboxylic acid and/or anhydride. It further is believed that a one to one condensation reaction occurs between the alkenyl compound having a carboxylic acid and/or anhydride and the hindered phenol.

By practicing process of the present disclosure, it was found that polyolefins having pendant hindered phenols can be advantageously prepared by reactive processes such as suspensions, swelling and melt compounding directly from the polyolefin, e.g., a non-functional polyolefin. As used herein, melt or reactive compounding refers to chemically reacting components including at least one polyolefin with mixing to form covalent bonds among the components in which at least the polyolefin is in a molten state. Reactive compounding as used herein includes reactive extrusion, e.g., chemically reacting a polyolefin in an extruder and discharging the products. For example, reactive extrusion with a twin screw extruder can readily melt, homogenize, and pump polymers through a die via co-rotating, intermeshing twin-screws. During reactive extrusion, components can react in the extruder to form the polyolefins having pendant hindered phenols of the present disclosure. An advantage of reactive compounding in general and reactive extrusion, in particular, in practicing aspects of the present disclosure is a mass production, high throughput of polyolefins having pendant hindered phenols.

During reactive compounding it is preferably to have at least one of the polyolefin components in a molten state, e.g., the components are heated to at least about 180° C., such as from about 180° C. to about 280° C. In some aspects, polyolefin having pendant hindered phenol groups of the present disclosure can be prepared by subjecting the components to reactive compounding through an extruder, i.e., reactive extrusion. In reactive extrusion processes, the components can have a reaction temperature of at least about 200° C., e.g., at least about 210° C., 220° C., 230° C., 240° C., 250° C., 260° C., 270° C., 280° C. etc. and values therebetween. As an example, a polyolefin having pendant hindered phenol groups of the present disclosure can be prepared by subjecting the components to reactive compounding through an extruder in which the components are heated to a temperature of from about 200° C. to about 280° C., e.g. from about 200° C. to about 260° C.

In addition to reactive compounding, polyolefins having pendant hindered phenols of the present disclosure can be prepared by other processes in which the polymeric component is in a molten state. Such processes can include mixing the components together including a polyolefin with a solvent to form a slurry of wetted polyolefin particles and heating the slurry to effect reactions. Such processes can also include mixing the components together including a polyolefin with a solvent to form a suspension of polyolefin particles in the solvent and heating the suspension. Such wetted or suspension processes can generally be carried out at a lower temperature than reactive compounding via an extrusion since the polyolefin is not heated to a temperature needed for it to flow, but such wetted or suspension processes are not as effective for large scale, mass production. Such wetted or suspension processes can be carried out at temperature of about 170° C. or higher, e.g., from about 180° C. to about 260° C.

Additives, fillers, or engineering polymers optionally can be combined with the polyolefins having pendant hindered phenols of the present disclosure and blends thereof to achieve various polymer compositions and material properties. The polyolefins having pendant hindered phenols and compositions thereof can be formed as granules which are an advantageous form for use in other processes. It is also possible to directly carry out injection molding or extrusion of the polyolefins having pendant hindered phenols and compositions thereof to form sheets or profiles to fulfill specific performance requirements.

In an aspect of the present disclosure, a polyolefins having pendant hindered phenols can have the following Formula (I):

$$\text{PO}(X)_a\text{—}(HP)_b\ (A)_c \tag{I}$$

wherein PO represents a polyolefin, e.g. a polyethylene, polypropylene; (X) represents a residue of an alkenyl compound with a carboxylic acid and/or anhydride bound to the PO and having an HP bound to the alkenyl compound residue; —(HP) represents a hindered phenol group bound to the PO through the residue (X) but having free hydroxyl groups; and (A) represents a reaction residue of the alkenyl compound having the anhydride and/or carboxylic acid bound to PO but without a hindered phenol bound to the residue. The variables a, b and c each represent the number of units of (X), —(HP) and (A), respectively, as a mole percent (mol %) relative to the olefin repeating unit in the polyolefin chain. Since HP reagents can have multiple HP units, the mol % of the —(HP) groups is based on the number of HP units from the HP reagent having multiple HP units that are not covalently bound to the polyolefin. The variables a and b can independently range from greater than zero and no more than about 20 mol %, e.g., from 0.05 mol %, 0.1 mol %, 0.2 mol %, 0.3 mol %, 0.4 mol %, 0.5 mol %, 0.7 mol %, 0.8 mol %, 1 mol %, etc. up to about 15 mol %, up to about 10 mol %, up to about 5 mol %, up to about 3 mol %, up to about 2 mol %, etc. and values therebetween. The variable c can range from 0 to about 20 mol %, e.g., from 0 mol %, 0.01 mol %, 0.1 mol %, 0.5 mol % and up to about 15 mol %, up to about 10 mol %, up to about 5 mol %, up to about 3 mol %, etc. and values therebetween.

In some instances, the variables a or b can independently range from about 0.1 mol % to about 10 mol %, e.g., from about 0.1 mol % to about 3 mol %, or about 0.2 mol % to about 2 mol %; c can range from 0 to about 10 mol %, such as from about 0.01 mol % to about 5 mol %.

Advantageously, polyolefins having pendant hindered phenols according to Formula (I) can be prepared substantially free from other polyolefins having pendant hindered phenols prepared by a different process.

In some aspects, a polyolefin or polyolefin chain of polyolefin having pendant hindered phenol groups can have the following Formula (II):

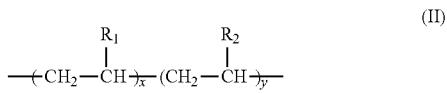

(II)

wherein $R_1$ represents H or $CH_3$; $R_2$ represents H or a $C_{1-10}$ substituted linear, branched, or cyclic alkyl or aryl moiety, x is an integer of at least 100, e.g., at least 1,000 (such as from 100 to about 50,000), y is an integer of at least 10, e.g., at least 100 (such as from 10 to about 10,000). In some embodiments, x is an integer of at least 100, e.g., at least 500, at least 1,000, and up to about 100,000 such as up to about 50,000 and values therebetween; and y is an integer of at least 10, e.g., at least 100, at least 500, at least 1,000 and up to about 50,000, up to about 20,000, up to about 10,000 and values therebetween. Such polyolefins include, without limitation, a polyethylene and a polypropylene and various commercial variants thereof.

Useful alkenyl compounds having a carboxylic acid and/or anhydride that can be used in preparing polyolefins having pendant hindered phenols include those in which the alkenyl group of the compound can react with the polyolefin via a free radical reaction. Such alkenyl compound having a carboxylic acid and/or anhydride include for example, alkenyl carboxylic acids, e.g., acrylic acid, methacrylic acid, etc. and alkenyl anhydrides, such as, for example, cyclic alkenyl anhydrides such as maleic anhydride, citraconic anhydride, tetrahydro-phthalic anhydride, alkenyl succinic anhydrides (ASA) such as allyl succinic anhydride, etc. and any combination thereof.

As noted above, (A) represents a residue grafted on the polyolefin from an alkenyl compound having a carboxylic acid and/or anhydride, e.g. a maleic anhydride residue (MA) grafted on the polyolefin. Hence, when the alkenyl compound having a carboxylic acid and/or anhydride used to prepare the polyolefins having pendant hindered phenols is maleic anhydride, (A) refers to the residue that results from a maleic anhydride modified polyolefin, which is in effect a pendant succinic anhydride group on the polyolefin after a free radical reaction between the maleic anhydride and the polyolefin. By convention, such a group is called a maleic anhydride residue or maleic anhydride group since the starting material is maleic anhydride. (X) represent a reaction residue that results from a reaction of the alkenyl carboxylic acid or anhydride and a hindered phenol reagent to form a hindered phenol covalently bound to the polyolefin through the alkenyl compound having a carboxylic acid and/or anhydride grafted on the polyolefin.

To accelerate reaction of the alkenyl compound on the polyolefin, free radical initiators can be included in the reactive components. Such initiators include, for example peroxides such as dicumyl peroxide, cumyl hydroperoxide, isopropylcumyl hydroperoxide, di(tert-butyl)peroxide, tert-butyl hydroperoxide, tert-Amyl hydroperoxide, high temperature peroxides, etc., compounds that form radicals upon heating such as 2,3-dimethyl-2,3-diphenylbutane, etc.

Hindered phenol reagents that can be used in processes of the present disclosure can be represented by the following Formula (III).

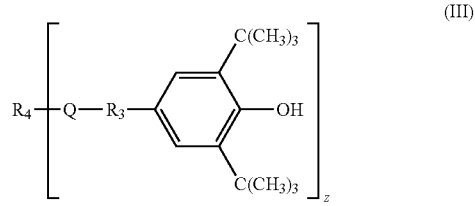

(III)

wherein Q represents —OOC—, —NOC—, —OCN—; $R_3$ represents a linker such as a $C_{1-8}$ linker, preferably a —$CH_2$—$CH_2$— or —$CH_2$— linker; $R_4$ need not be present, if present $R_4$ represents H or a substituted or unsubstituted alkyl group such as a $C_{1-30}$ alkyl unsubstituted or substituted with thiol, ether, ester linking groups within the $C_{1-30}$; or $R_4$ and Q together form a ring structure such as a 1,3,5-triazinane-2,4,6-trione; and z is an integer from 1 to 4 when $R_4$ represents a substituted or unsubstituted alkyl group. In addition to the hydroxy group of an HP reagent, an HP reagent containing ester or acid group can react with a the carboxylic acid or anhydride of the alkenyl compound. Table 1 below shows examples of HP reagents that can be used in preparing polyolefins having pendant hindered phenols. As shown in Table 1 below, HP reagents can include multiple HP units.

TABLE 1

Examples of HP reagents

TABLE 1-continued
Examples of HP reagents
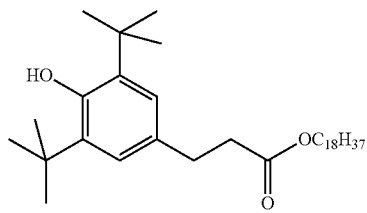
Irganox 1076
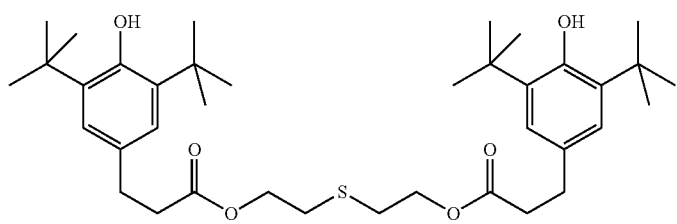 [SMILES: CC(C)(C)c1cc(CCC(=O)OCCSCCOC(=O)CCc2cc(C(C)(C)C)c(O)c(C(C)(C)C)c2)cc(C(C)(C)C)c1O]
Irganox 1035
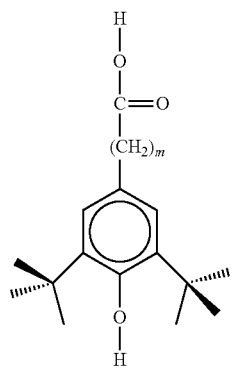
m can be 1 to 8
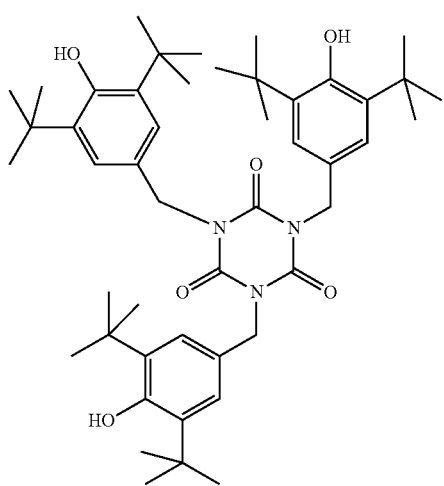 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
Irganox 3114

TABLE 1-continued

Examples of HP reagents

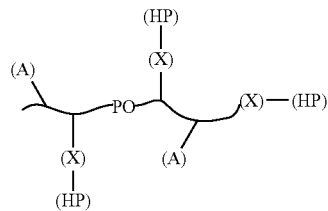

In practicing certain aspects of the present disclosure, polyolefins having pendant hindered phenols can be prepared by reacting the following components together under heat: (a) a polyolefin; (b) an alkenyl compound having a carboxylic acid and/or anhydride, in which the alkenyl group of the compound can graft or add on to the polyolefin via free radical reactions; and (c) a hindered phenol reagent that can react with the carboxylic acid and/or anhydride of the alkenyl compound.

For example, Scheme 1 below illustrates a process of preparing a polyolefin having hindered phenol groups bound thereto. In Scheme 1, PO represents a polyolefin, A represents an alkenyl compound with an anhydride and/or carboxylic acid, (A) represent a residue of A bound to the PO, (X) represents a residue of A bound to the PO and having an HP unit bound to the residue of A, —(HP) represent hindered phenol bound to the PO through the residue (X) but having a free —OH group. Scheme 1 illustrates that by combining a polyolefin with alkenyl compound having a carboxylic acid and/or anhydride and hindered phenol reagent under heat (A), polyolefin having hindered phenol groups bound thereto can be prepared directly from the polyolefin.

-continued

Scheme 2 below illustrates a process of preparing a polyolefin having hindered phenol groups bound thereto via a maleic anhydride residue. As illustrated in Scheme 2 below, PO represents a polyolefin, MA represents maleic anhydride, (MA) represent a residue of maleic anhydride bound to the PO, (X) represents a residue of MA bound to the PO and having an HP bound to the residue of MA, —(HP) represents hindered phenol group bound to the PO through the residue (X) but having a free —OH group.

Scheme 1.

Scheme 2.

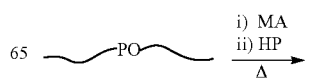

-continued

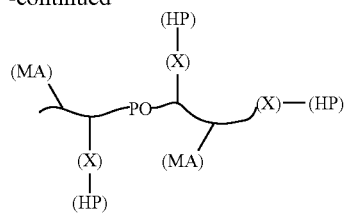

Schemes 1 and 2 show combining a polyolefin with alkenyl compound having a carboxylic acid and/or anhydride (scheme 1) such as maleic anhydride (Scheme 2) and a hindered phenol reagent can produce a polyolefin having hindered phenol groups covalently bound to the polyolefin through the alkenyl compound residue. A free radical initiator is generally combined with the components to accelerate the reaction. In the reaction of Schemes above, the hindered phenol groups are covalently bound to the polyolefin through a reaction residue formed from an alkenyl carboxylic acid or anhydride residue (scheme 1) such as a maleic anhydride residue (Scheme 2) on the polyolefin. Schemes 1 and 2 shows some alkenyl compound residues on the polyolefin chain that have not reacted as an illustrative example. The amount of residues without hindered phenol bound thereto will depend on the molar concentration of the (a) alkenyl compound having a carboxylic acid and/or anhydride and the (b) hindered phenol reagent, and the reaction conditions. In principal, when there is an excess of hindered phenol reagent, all alkenyl compound residues are available to react with the hindered phenol reagent. The polyolefin chains can be represented by Formula (II) above and hindered phenol reagents can be represented by Formula (III) above, e.g., an HP reagent containing ester or acid group can react with the carboxylic acid and/or anhydride of the alkenyl compound.

In certain aspects of the present disclosure, the process of preparing a polyolefin having pendant hindered phenol groups can include reacting under heat the following components: 600 to 50 parts by weight of (a) a polyolefin, 1 to 20 parts by weight of (b) an alkenyl compound having a carboxylic acid and/or anhydride, and 10 to 90 parts by weight of (c) a hindered phenol reagent. Optionally, a free radical initiator can be included with the components.

When the alkenyl compound is maleic anhydride and the HP reagent has four hindered phenols such as Irganox 1010, there are potentially four hydroxyl groups that can react with the anhydride and the anhydride has two potential reactive groups for an esterification reaction. However, it is more practical to have a one-to-one molar amount of the alkenyl anhydride and the HP reagent.

Preparing a polyolefin having a plurality of hindered phenol groups directly from a polyolefin can be carried out by reacting the polyolefin, alkenyl compound having a carboxylic acid and/or anhydride with a hindered phenol reagent under heat, e.g., by heating the components to at least about 170° C., such as by reactive extrusion. For example, the polyolefin can be premixed with the alkenyl compound having a carboxylic acid and/or anhydride, initiator and hindered phenol and then the mixture reactive compounded in an extruder to form the polyolefin having hindered phenol groups. When the components are premixed, it is preferable to use the polyolefin in flake or powdered form since such forms have higher surface area than pellets. Alternatively, or in combination, a polyolefin can be fed into the extruder up stream of alkenyl compound having a carboxylic acid and/or anhydride, initiator and hindered phenol. The alkenyl compound having a carboxylic acid and/or anhydride, initiator and hindered phenol can be added as a premixture together or as separate components downstream of the polyolefin in the extruder. The reactive components are then reactive compounded in the extruder to form the polyolefin having hindered phenol groups. Such reactive compounding allows preparation of the polyolefins of the present disclosure in a continuous process and in a single reaction step.

As an alternative to reactive compounding, a polyolefin having a plurality of hindered phenol groups can be prepared directly by a wetting process by mixing a polyolefin, an alkenyl compound having a carboxylic acid and/or anhydride, a hindered phenol reagent and a solvent for the hindered phenol reagent to form either a slurry of wetted polyolefin particles or a suspension of polyolefin particles in the solvent.

For example, a solution or mixture can be prepared including a solvent for the hindered phenol reagent and the hindered phenol reagent. The solution or mixture can be combined with polyolefin polymer particles to form a slurry. The alkenyl compound having a carboxylic acid and/or anhydride can be included in the solution with the hindered phenol or combined with the other reagents separately or both. The slurry components can then be baked at a temperature of at least about 170° C., such as at least about 180° C., or at least about 200° C. and up to about 280° C., to affect the reaction between the polyolefin, alkenyl compound having a carboxylic acid and/or anhydride and hindered phenol reagent.

Alternatively, the solution or mixture including the solvent for the hindered phenol reagent and the hindered phenol reagent can be combined with polyolefin polymer particles to form a suspension and the suspension heated. The alkenyl compound having a carboxylic acid and/or anhydride can be included in the solution with the hindered phenol or combined with the other reagents separately or both. For a suspension process, it is preferable to use a high boiling solvent, e.g., a solvent with a boiling point of at least about 170° C. to about 235° C. to minimize evaporation of the solvent, and/or heating the components under pressure of greater than atmospheric pressure. The suspension can then be heated to at least about 170° C., such as at least about, 180° C., 190° C., 200° C., etc. to affect the reaction between the polyolefin, alkenyl compound having a carboxylic acid and/or anhydride and hindered phenol reagent.

The polyolefin having pendant hindered phenol groups covalently bound thereto can be more thermally stable than the polyolefin without the pendant hindered phenol groups and can be even more thermally stable than a blend of the polyolefin and an equivalent amount of hindered phenol not chemically bound to the polyolefin. In some aspects, the polyolefin having pendant hindered phenol groups covalently bound thereto according to the present disclosure can have an onset degradation temperature of no less than about 290° C., e.g., no less than about 300° C., 310° C., 320° C., 330° C., 340° C., etc. and values therebetween.

Further, the polyolefin having pendant hindered phenol groups covalently bound thereto according to the present disclosure can be used to prepare other functional polyolefin polymers. For example, the polyolefin having hindered phenol groups covalently bound thereto can be reacted with additional or a different alkenyl compound having a carboxylic acid and/or anhydride to graft the alkenyl compound to the polyolefin having hindered phenol groups covalently bound thereto forming residues from the alkenyl compound on such a polyolefin.

EXAMPLES

The following examples are intended to further illustrate certain preferred embodiments of the invention and are not limiting in nature. Those skilled in the art will recognize, or be able to ascertain, using no more than routine experimentation, numerous equivalents to the specific substances and procedures described herein.

Reactive Compounding

The following examples were performed via reactive compounding (e.g., melt compounding via an extruder) using Coperion 26 mm co-rotating twin-screw extruder, fitted with a mixing screw and 44 L/D ratio. Note: all compositions cited below in reactive compounding are in anhydride residues in a single reaction step. The reactive compounding process can be performed through extrusion equipment such as a co-rotating twin screw compounder at 200 to 240° C., preferably at 210-220° C.

Scheme 3 below shows a proposed structure of the formed polypropylene having pendant hindered phenol groups covalently bound thereto via maleic anhydride residues prepared from a one-to-one mole ratio of MA to Irganox 1010.

Scheme 3 Proposed structure of a PP(MA)-(HP) in which the hndered phenol reagent (starting HP reagent: Irganox1010) is covalently bound to the polpropylene backbone via the maleic anhydride residue on the polyolefin.

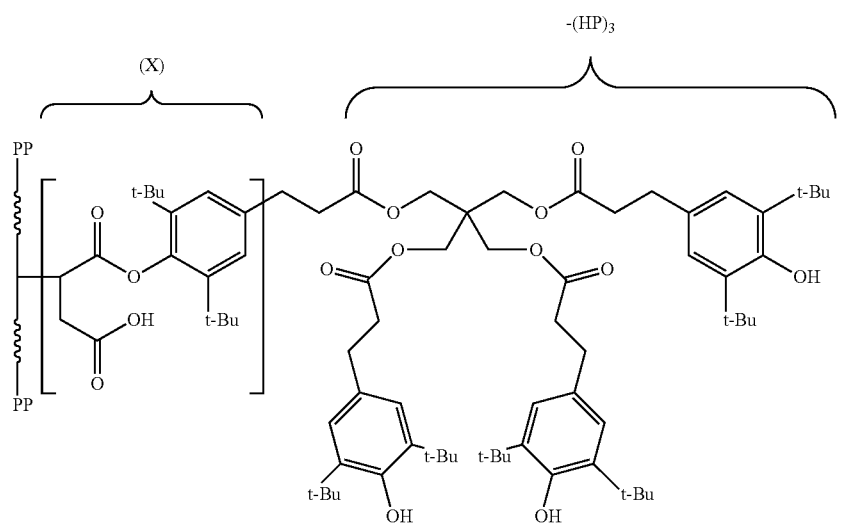

weight percent, unless specified otherwise such as in molar percent. Further, all temperatures cited below for reactive extrusion relate to the temperature of the extruder unless specified otherwise. The temperature of the components in the extruder is typically 10-20° C. higher than the extruder temperature during normal processing due to shearing.

Example 1: Preparation of PP(MA)-(HP) from PP Flakes

A polypropylene having hindered phenol groups covalently bound to the polyolefin through a reaction residue formed from a maleic anhydride residue on the polypropylene was prepared directly from polypropylene. For this Example 1, the polypropylene was in the form of flakes, which is commercially available such as from Hengli Petrochemical Co. In a typical run, the following components were dry-mixed in a standard pellet blender: polypropylene (PP) (from about 85% to about 99%) in the form of flakes, maleic anhydride (from about 0.1% to about 1.2%), dicumyl peroxide (DCP, about 0.02-0.06% relative to the maleic anhydride) and Irganox 1010 (from about 0.5% to about 15%). The mole percent of the starting reagents based on the above weight ranges were for maleic anhydride (about 98 g/mol) from about 0.05 mol % to about 0.6 mol %), and Irganox 1010 (about 1178 g/mol, which includes 4 HP units) from about 0.07 mol % to about 2.1 mol %.

The resulting mixture was then fed in an extruder and reactive compounded to form a polypropylene having pendant hindered phenol groups bound thereto via maleic As shown in Scheme 3 above, the residue of maleic anhydride bound to the polypropylene also covalently bonds the hindered phenol reagent via one of the hydroxyl groups of the hindered phenol reagent and is shown as (X). For this example, there are three hindered phenol units having free hydroxyl groups (illustrated as —(HP)$_3$), which can improve the thermal stability of the polypropylene.

For the melt reaction of the polyolefin with the alkenyl compound having a carboxylic acid and/or anhydride, hindered phenol, and peroxide initiator, we observed minimum side reactions such as polymer chain degradation and crosslinking reactions. It is believed such side reactions were either significantly depressed or completely eliminated due to an in situ formation of a relatively stable radical species.

Scheme 4 below illustrates the proposed mechanism for the lack of degradation and crosslinking of the polyolefin in the reactive melt process of the present example. Scheme 4 shows a free radical mediated grafting reaction of maleic anhydride (MA) to polypropylene (PP) using dicumyl peroxide (DCP) thermal initiator, in which hindered phenol (HP) antioxidant is also present with a specific concentration. Under an elevated temperature, DCP initiator is decomposed to produce free radicals (O*) that spontaneously extract protons from PP chain and HP moiety to form PP polymeric radical (A) and HP radical (B), respectively. Although PP carbon radical (A) is very reactive, the simultaneously formed HP oxygen radical (B) is relatively stable.

Scheme 4. Proposed reaction of alkenyl compound to polyolefin with hindered phenol reagent present.

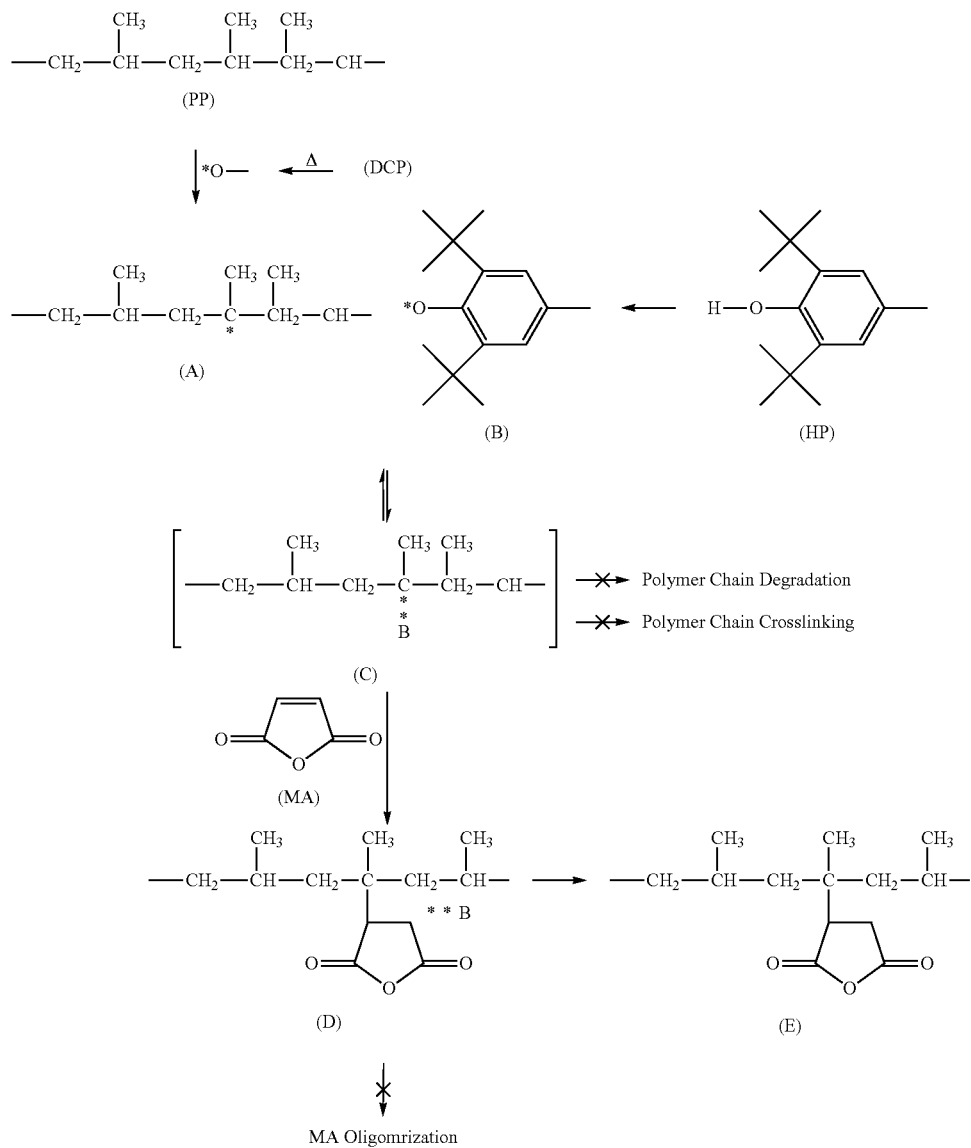

As illustrated in Scheme 5 below, free radical coupling reaction between two HP radicals likely does not happen due to steric hindrance, and the HP oxygen radical is known to engage p-electrons delocalization (resonance) around phenyl ring to increase its stability.

The combination offers the condition for the electron pairing between PP polymeric radical (A) and HP radical (B) to form a relatively stable intermediate (C) complex, as shown in Scheme 4. This resulting intermediate (C) complex prevents the common undesirable side reactions (i.e. chain Scheme 5

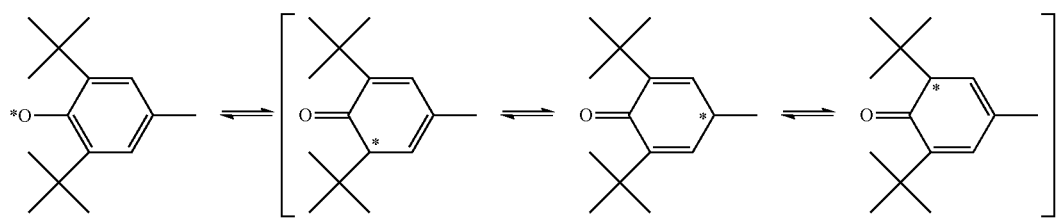

degradation and crosslinking) associated with the polymeric radicals (A). However, the PP polymeric radical (A) in the complex (C) is still reactive enough for the addition reaction with maleic anhydride (MA) to form the MA grafted PP (PP(MA)) structure (D), and the subsequent MA oligomerization is very difficult due to the combination of steric hindrance and stable propagating site.

Example 2: Preparation of PP(MA)-(HP) from PP Pellets

A polypropylene having hindered phenol groups covalently bound to the polyolefin through a reaction residue formed from a maleic anhydride residue on the polypropylene was prepared directly from polypropylene. For this Example 2, the polypropylene was in the form of pellets, which is commercially available such as from Formosa Plastics Co.

For this example, polypropylene pellets were fed upstream of the twin-screw extruder followed by adding a mixture of maleic anhydride, dicumyl peroxide and Irganox 1010 at a subsequent feed location along the extruder (downstream feed). The following amounts of the components typically used include polypropylene (PP) (from about 85% to about 99%) in the form of pellets, maleic anhydride (from about 0.1% to about 1.2%), dicumyl peroxide (DCP, about 0.02-0.06% relative to the amount of maleic anhydride) and Irganox 1010 (from about 0.5% to about 15%).

As shown in Table 2 below, the melt flow index of polypropylene having pendant hindered phenol groups bound thereto is no less than the melt flow index from the initial polypropylene. The melt flow index values of the initial polypropylene and final product indicates that there was not a significant amount of degradation of the polyolefin by the reactive compounding process.

TABLE 2

Melt Flow Index (MI) measured at 230° C./2.16 kg (ASTM# D1238)†

| Sample | (X) (mol %)* | -(HP) (mol %) | MI (g/10 min) |
|---|---|---|---|
| PP flakes | 0 | 0 | 3.5 |
| PP(MA)-HP (Example 1, flakes) | 0.09 | 0.28** | 4.5 |
| PP2020 Pellets | 0 | 0 | 4.0 |
| PP(MA)-HP (Example 2, pellets) | 0.09 | 0.26** | 5.0 |

†Melt Flow Index was measured according to ASTM# D1238 under condition specified in ASTM standard, i.e., at 230° C. with 2.16 Kg dead weight to push molten material.
*The calculations assume that all of the maleic anhydride added to the feed in reactive compounding added to the polypropylene and reacted with the HP reagent.
**The mol % of -(HP) (i.e., hindered phenol with free OH groups) for this example was calculated assuming one out of the four free HP groups in the HP reagent (Irganox 1010) is consumed by attaching to one (MA) residue.

Example 3: Preparation of PP(MA)-(HP)

In this example, equal mole amounts of -MA to Irganox 1010 were used in the feed stream of a twin screw extruder with polypropylene in pellet form. The pellets were compounded with the twin screw extruder feeding Irganox 1010 powder and MA from downstream of the pellets with a separate weight loss feeder (i.e. PP was fed upstream and a MA/1010 mixture was fed downstream with a side feeder). The above compounding process can also be preferably performed with both PP and an MA/1010 mixture both feeding upstream via separate feeders.

Sufficient compounding temperature and residence time for the components in the barrel of the extruder were needed for the esterification reaction to occur between -MA and corresponding —HP functional groups. As such, preferred compounding temperatures need to reach 230 to 260° C., preferably 240 to 250° C. with sufficient barrel length so that the melt was maintained at these temperatures for a sufficient period of time. In some instances, water is observed in the reacted components which is believed to result from acid versions of the anhydride esterifying with the hindered phenol. Significant amount of water can limit the amount of covalently bound HP during a particular run. However, multiple runs can be performed to progressively increase the molar percent of bound HP on the polyolefin. Molar percentage of at least 6 mol % HP units typically can be readily achieve by compounding the components in two separate runs.

The operating temperature of non-functional polypropylene (PP) is increased by chemically attaching hindered phenol groups. Such an attachment results in an increase of the continuous use temperature of PP. The typical continuous use temperature for commercial PP is between 70° C. to 110° C. This temperature can be increased to a continuous use temperature of between 130° C. to 160° C. for PP(MA)-(HP) prepared according to aspects of the present disclosure. With sufficient molar concentration of —HP units, a PP(MA)-(HP) prepared according to aspects of the present disclosure can be used at temperatures up to 190° C., and has short-term thermal stability to over 300° C. This enables compounding PP(MA)-(HP) with other high temperature polymer systems that require high processing temperatures.

TGA Study to Examine Thermal-Oxidative Stability of a Polyolefin

From work of Chung et al, Macromolecules, 2019:52: 5618-5637, thermogravimetric analysis (TGA) can be used as a simple measure of evaluating thermal stability both qualitatively and quantitatively. Specifically, the onset of degradation temperature ($T_d$) in a TGA, defined here as the temperature when a material experiences a 5% weight loss under conditions of heating in air at 10° C./min, was found to be consistent with other stability measures. The 5% number is selected to eliminate potential effect of volatiles such as residual solvent or moisture from the process. Additional weight loss in a TGA curve can be influenced by different degradation components and complicates the interpretation when different functional groups are involved. Samples can be tested from pellets, powder, strand or films, with films preferred to acquire a representative section for the measurement. Sample films are typically 50 μm to 100 μm in thickness.

FIG. 1 shows pictures of the results of subjecting sample films to 170 in air for 1.5 hours. The sample on the left labeled PP is a commercial PP sample film and the sample on the right is a polypropylene having hindered phenol groups covalently bound thereto (sample PPHP030) having approximately 0.3 mol % HP and prepared according to aspects of the present disclosure. As illustrated by the figure, the PP sample completely deteriorated while the sample PPHP030 film remained completely intact. In addition, PP(MA)-(HP) samples prepared according to aspects of the present disclosure maintain comparable mechanical and electrical properties of PP while significantly improving both processing and long-term thermal stability over the base PP resin used.

Example 4: Additional Preparation of PP(MA)-(HP)

Figure 2A:
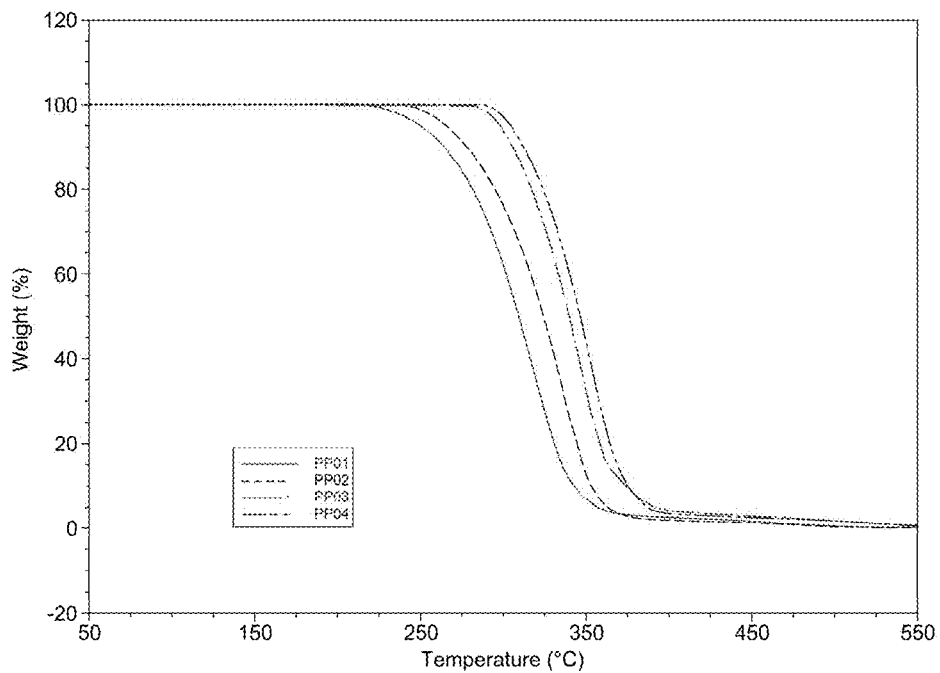
FIGS. 2A and 2B are TGA plots of various polypropylene samples.
Figure 2B:
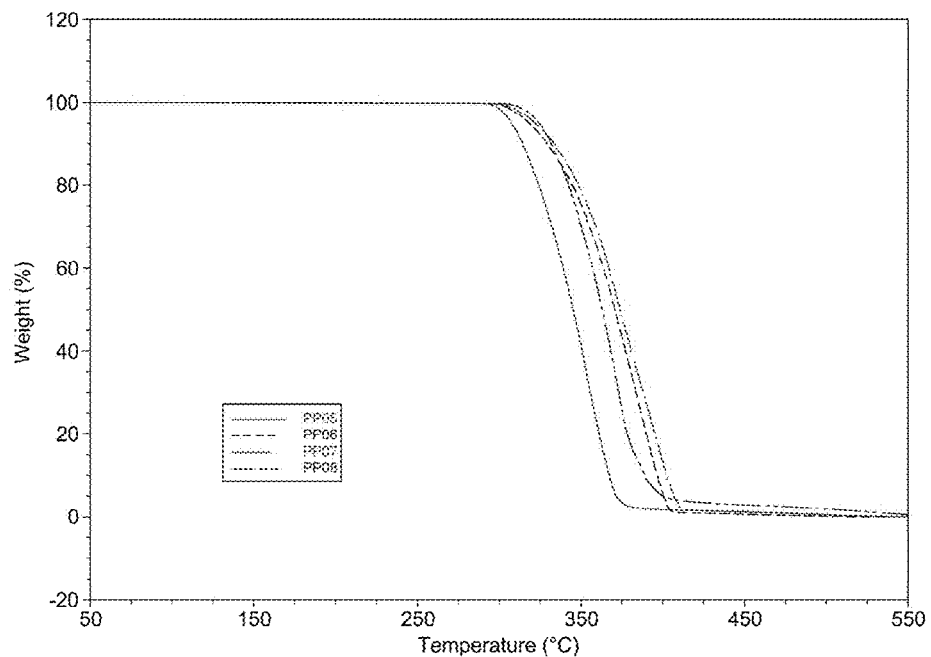

Additional studies were conducted to evaluate several commercial grades of PP both before and after reactive melt compounding of the commercial PP with maleic anhydride and Irganox 1010. Table 3 below identifies samples used in various TGA studies of these materials. Thermal stabilities were evaluated by running standard TGAs in air at 10° C. per min. FIG. 2A shows TGA results of as received commercial PPs (i.e. PP01 to PP04); and FIG. 2B shows the TGA results of the commercial PPs after the reactive melt compounding of the commercial PP with maleic anhydride and Irganox 1010 (PP05 to PP08).

TABLE 3

Description of commercial and modified polypropylene (PP) Samples.

| Sample ID | Description |
|---|---|
| PP01 | Commercial reactor flake PP without additives or modifiers |
| PP02 | Commercial BOPP produced available from Formosa Plastics (PP2020) |
| PP03 | Commercial high temperature cable grade PP available from Lyondell Basell (PP-41-M) |
| PP04 | Commercial high temperature cable grade PP available from Lyondell Basell (PP1510) |
| PP05 | Reactive melt compounding of PP01 to form a PP(MA)-HP having approximately (MA):-(HP) = 0.09:0.28 mol % |
| PP06 | Reactive melt compounding of PP02 to form a PP(MA)-HP having approximately (MA):-(HP) = 0.09:0.26 mol % |
| PP07 | Reactive melt compounding of PP02 to form a PP(MA)-HP plus additional cable grade modifiers, having approximately (MA):-(HP) = 0.10:0.30 mol % |
| PP08 | Reactive melt compounding of PP04 to form a PP(MA)-HP having approximately (MA):-(HP) = 0.10:0.30 mol % |

While degradation temperature ($T_d$) is a good indicator of short term or processing thermal stability of a polyolefin, other thermal stability techniques, such as iso-thermal TGA, can be used to determine long-term thermal stability of a polyolefin. An iso-thermal TGA test is performed by holding a sample at different preset temperatures, typically between 190° C. to 250° C., and observing both time to a certain weight loss, e.g., 5%, and rate of degradation (slope of the degradation curve). In general, iso-thermal TGA analysis can readily separate the long-term thermal responses of polyolefins. It was observed that iso-thermal TGA analysis can more readily show thermal stability differences between a polyolefin having a dry blended thermal stabilizer compared to a polyolefin having covalently bound hindered phenol even when both materials have similar $T_d$ values in a standard TGA.

As shown by FIGS. 2A and 2B, the standard TGA weight loss curve of PP05, i.e. modified PP01, shifted to approximately 50° C. higher compared to unmodified PP01 resin. Since most commercial PPs contain free added stabilizer, varying degrees of improvement in the on-set of degradation temperature ($T_d$), namely from 20° C. to 40° C., was found, depending on feedstock.

Figure 3:
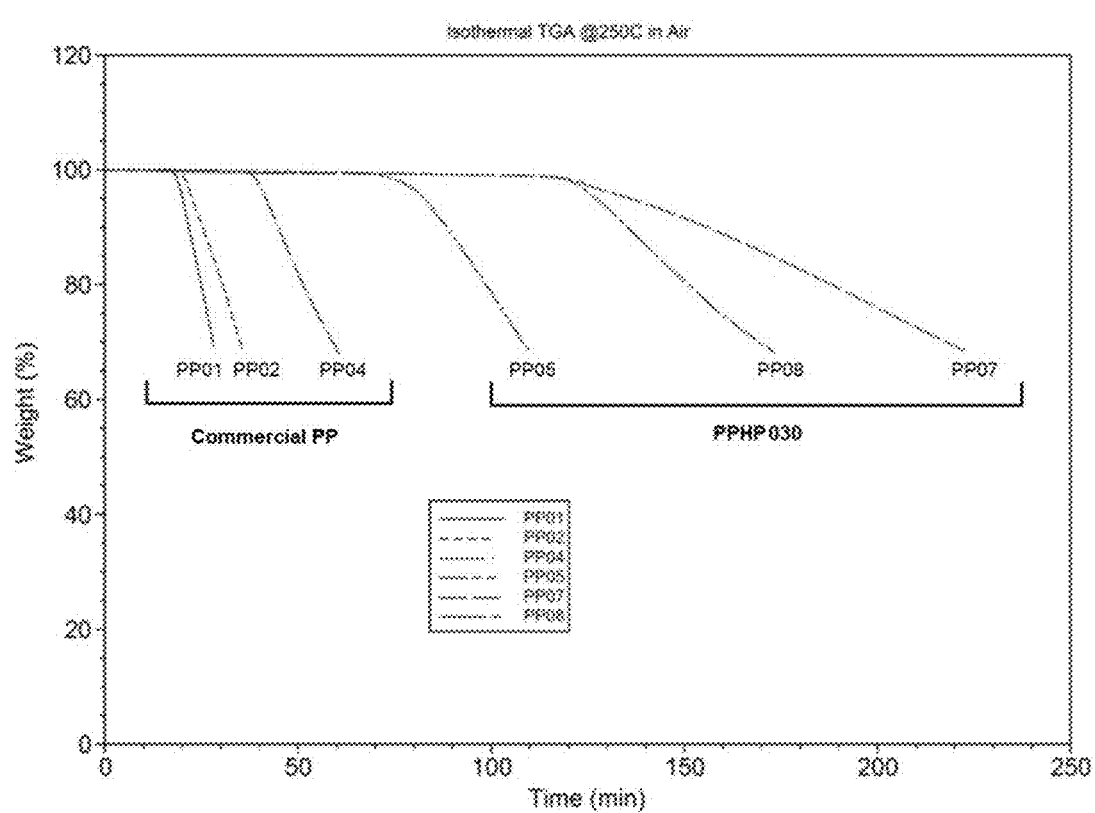
FIG. 3 is an isothermal TGA plot of various polypropylene samples.

However, longer term thermal stabilities of these materials can be better evaluated via isothermal TGAs as seen in FIG. 3. It is well known that the addition of various commercial thermal stabilizers by blending has only a limited effect on overall PP thermal stability due to migration of the stabilizers from the polymer matrix and loss due to volatility of the stabilizer. Phase separation between PP and the stabilizer can also influence long term thermal stability. As shown in FIG. 3, the long term thermal stability of polypropylene having hindered phenols covalently bound thereto (e.g., PP05, PP08, PP07) were superior to corresponding PP materials even with thermal stabilizers (e.g., PP04).

Example 5: Preparation of PP-(MA)-(HP)(MA)

Maleic anhydride grafted polypropylene was prepared from polypropylene with covalently bound hindered phenol (PP(MA)-(HP)). For this example, PP(MA)-(HP) prepared according to Examples 1-4 above in the form of pellets were fed upstream of a twin-screw extruder followed by adding a mixture of maleic anhydride, dicumyl peroxide at a subsequent feed location along the extruder (downstream feed). The following amounts of the components typically were used: maleic anhydride (from about 0.5% to about 4.0%), dicumyl peroxide (DCP, about 0.02-0.06% relative to the weight percent of maleic anhydride).

Table 4 below identifies samples used in various TGA studies of maleic anhydride grafted polypropylene prepared from polypropylene with covalently bound hindered phenol compared to maleic anhydride modified PP from commercial sources.

TABLE 4

Sample description of commercial PP-MA and PP(MA)-(HP)(MA)

| Sample ID | Description |
|---|---|
| PP09 | PP-MA G3015 from Eastman |
| PP10 | PP-MA NG2006 from Shanghai Jingiao |
| PP11 | Reactive melt compounding of PP05 (in Table 3) to form a PP(MA)-(HP)(MA) having approximately MA grafting rate = 1.0-1.2 wt % |
| PP12 | Reactive melt compounding of PP06 (in Table 3) to form a PP(MA)-(HP)(MA) having approximately MA grafting rate = 1.0-1.2 wt % |

Table 5 below provides melt flow index values of a maleic anhydride grafted polypropylene having pendant hindered phenol groups bound thereto (PP(MA)-(HP)(MA)) and commercially available maleic anhydride modified PP (G3015 and NG2006). As shown by Table 5, PP(MA)-(HP)(MA) can be prepared having a higher molecular weight (i.e., lower melt flow index value) but comparable maleic anhydride content (MI of 6.4, MA 1.1 wt %) to a commercially available products (NG2006, MI of 22, MA of 0.9 wt %) (G3015, MI of >200, MA of 1.3 wt %).

TABLE 5

PP(MA)-HP(MA) compared with two commercial grades of maleic anhydride modified PP

| Sample | MA Approximate wt % | TGA (° C.) (on-set @ 5 wt % weight loss) | MI (g/10 min) |
|---|---|---|---|
| PP(MA)-(HP)(MA) | 1.1 | 290 | 6.4 |
| Eastman (G3015) | 1.3 | 260 | >200 |
| Shanghai Jinqiao (NG2006) | 0.9 | 270 | 22 |

Figure 4:
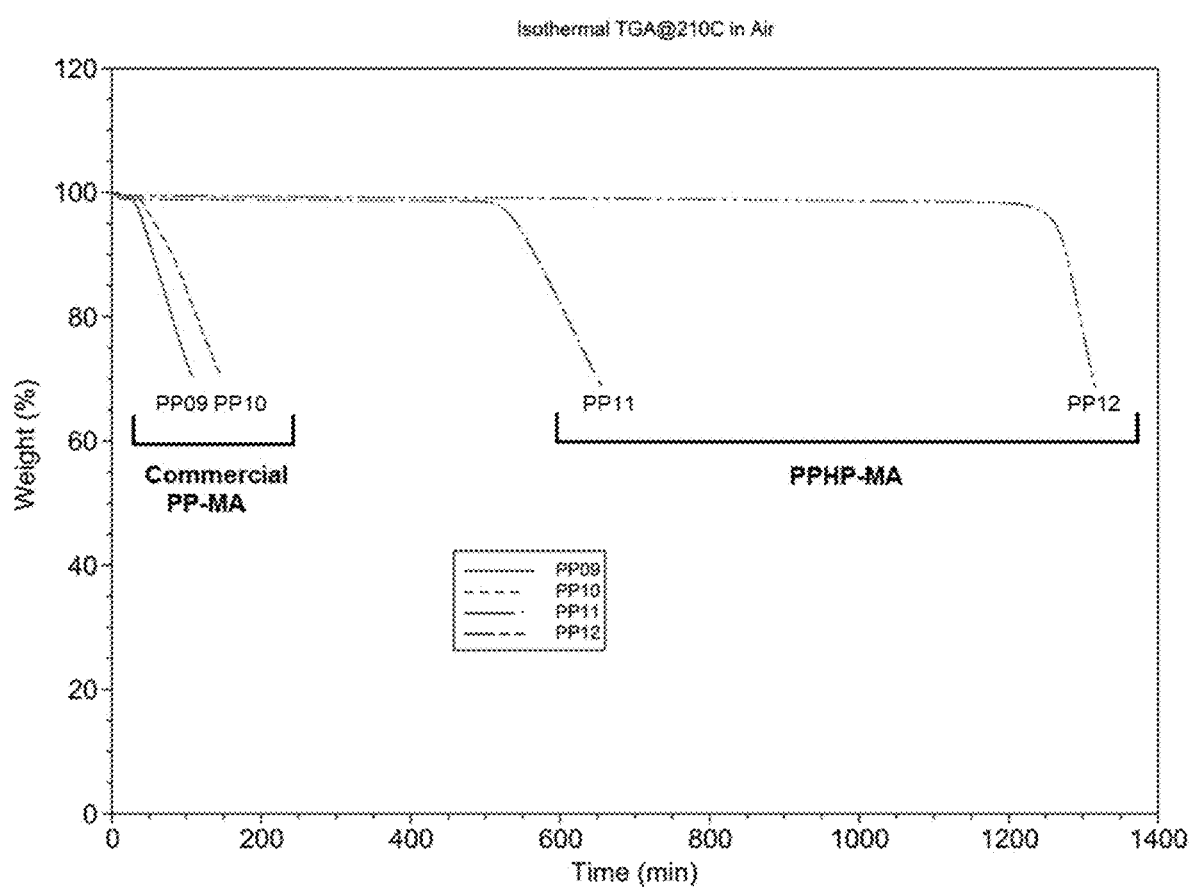
FIG. 4 is an isothermal TGA plot of various maleic anhydride modified polypropylene samples.

As shown in FIG. 4, the long-term thermal stability of maleic anhydride modified polypropylene prepared from polypropylene having hindered phenols covalently bound thereto (e.g., PP11, PP12) were superior to commercially available PP grafted maleic anhydride (e.g., PP09, PP10).

Only the preferred embodiment of the present invention and examples of its versatility are shown and described in the present disclosure. It is to be understood that the present invention is capable of use in various other combinations and environments and is capable of changes or modifications within the scope of the inventive concept as expressed herein. Thus, for example, those skilled in the art will recognize, or be able to ascertain, using no more than routine experimentation, numerous equivalents to the specific substances, procedures and arrangements described herein. Such equivalents are considered to be within the scope of this invention, and are covered by the following claims.

What is claimed is:

1. A polyolefin comprising hindered phenol groups covalently bound to the polyolefin through a residue of an alkenyl compound having a carboxylic acid and/or anhydride on the polyolefin, wherein the hindered phenol groups are covalently bound to the residue through a hindered phenol reagent, and wherein the hindered phenol reagent is covalently bound to the residue through a hindered hydroxyl group of the hindered phenol reagent.

2. The polyolefin of claim 1, wherein the residue of the alkenyl compound comprises a residue from maleic anhydride.

3. The polyolefin of claim 1, wherein the polyolefin comprises a polypropylene.

4. A polyolefin having pendant hindered phenols of Formula (I):

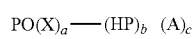

(I)

wherein PO represents a polyolefin; (X) represents a reaction residue of an alkenyl compound with a carboxylic acid and/or anhydride bound to the PO and having an hindered phenol bound to the alkenyl compound residue; —(HP) represents a hindered phenol group bound to the PO through the residue (X) but having a free hydroxyl group; and (A) represents a reaction residue of the alkenyl compound having the anhydride and/or carboxylic acid bound to PO but without an hindered phenol bound to the (A) residue; a and b range from greater than 0 mol % to 20 mol %, provided, however, there are multiple HP units for one or more X residues; and c ranges from 0 mol % to 20 mol %.

5. The polyolefin of claim 4, wherein a and b range from about 0.1 mol % to about 3 mol %.

6. The polyolefin of claim 4, wherein the residue of the alkenyl compound comprises a residue from maleic anhydride.

7. The polyolefin of claim 4, wherein the polyolefin comprises a polypropylene.

8. The polyolefin of claim 1, wherein the hindered phenol reagent has multiple hindered phenol units having free hydroxyl groups.

9. The polyolefin of claim 8, wherein the polyolefin has covalently bound thereto from 0.1 mol % to about 5 mol % of the hindered phenol groups having free hydroxyl groups.

10. The polyolefin of claim 8, wherein the hindered phenol reagent comprises the following formula:

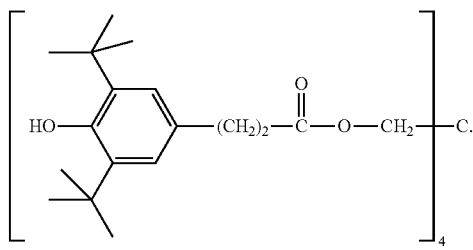

11. The polyolefin of claim 1, wherein the hindered phenol reagent has multiple hindered phenol units with free hydroxyl groups, wherein the residue of the alkenyl compound comprises a residue of maleic anhydride, and the polyolefin comprises a polypropylene.

12. The polyolefin of claim 4, wherein PO comprises Formula (II):

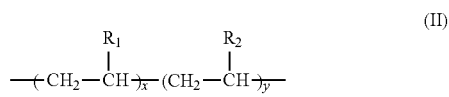

wherein $R_1$ represents H or $CH_3$; $R_2$ represents H or a $C_{1-10}$ substituted linear, branched, or cyclic alkyl or aryl moiety; x is an integer of at least 100; y is an integer of at least 10; and wherein a and b range from about 0.05 mol % to about 10 mol %.

13. The polyolefin of claim 12, wherein x is an integer of at least 1,000 and up to about 100,000; y is an integer of at least 10 to about 10,000.

14. The polyolefin of claim 4, wherein c ranges from about 0.01 mol % to about 5 mol %, and (A) represents a reaction residue of a cyclic alkenyl anhydride.

15. The polyolefin of claim 4, wherein c ranges from about 0.01 mol % to about 5 mol %, and (A) represents a reaction residue of maleic anhydride.

16. The polyolefin of claim 13, wherein the polyolefin is a polypropylene, c ranges from about 0.01 mol % to about 5 mol %, and (A) represents a reaction residue of maleic anhydride.

17. The polyolefin of claim 4, wherein the polyolefin is a polypropylene, c ranges from about 0.01 mol % to about 5 mol %, and (A) represents a reaction residue of maleic anhydride, and wherein the polyolefin has a melt index of 6.4 or less.

18. The polyolefin of claim 4, wherein the hindered phenol groups —(HP) are covalently bound to the residue (X) through a hindered phenol reagent comprising Formula (III):

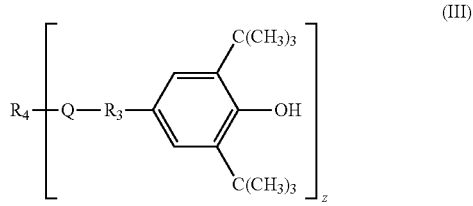

wherein Q represents —OOC—, —NOC—, —OCN—; $R_3$ represents a $C_{1-8}$ linker; $R_4$ represents a substituted or unsubstituted alkyl group; and z is 4.

19. The polyolefin of claim 4, wherein the polyolefin comprises a polypropylene and (X)—(HP) comprises the following formula:

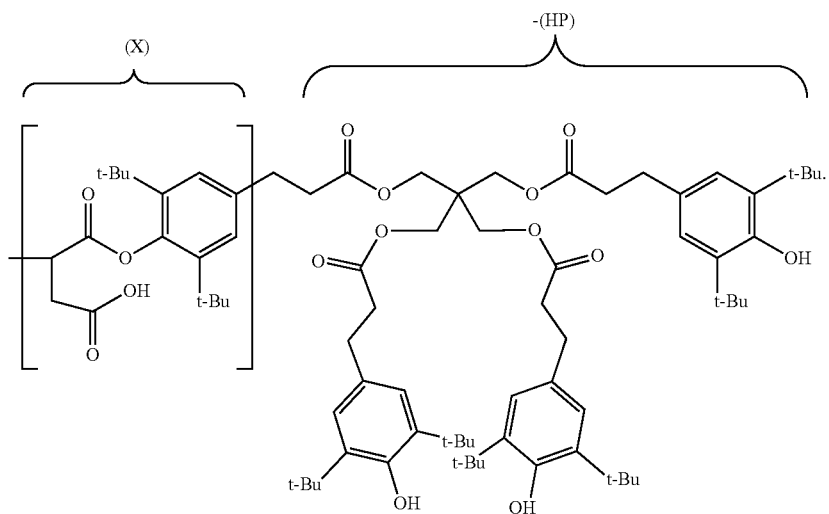
20. The polyolefin of claim 4, wherein the polyolefin has an onset degradation temperature of no less than about 290° C.
21. The polyolefin of claim 4, wherein the polyolefin comprises additives and/or fillers.
* * * * *